United States Patent
Fujiwara et al.

(10) Patent No.: US 8,083,418 B2
(45) Date of Patent: Dec. 27, 2011

(54) CONNECTOR HOLDER, OPTICAL-ELECTRICAL CONVERTER WITH ATTACHED CONNECTOR HOLDER, OPTICAL CONNECTOR FIXING STRUCTURE AND CONNECTOR HOLDER ASSEMBLY METHOD

(75) Inventors: Kunihiko Fujiwara, Sakura (JP); Akito Nishimura, Sakura (JP); Kenji Sasaki, Sakura (JP); Yukio Hayashi, Sakura (JP); Kazuhiko Kurata, Tokyo (JP); Takashi Yoshikawa, Tokyo (JP); Junichi Sasaki, Tokyo (JP)

(73) Assignees: Fujikura Ltd, Tokyo (JP); NEC Corporation, Tokyo (JP)

( * ) Notice: Subject to any disclaimer, the term of this patent is extended or adjusted under 35 U.S.C. 154(b) by 24 days.

(21) Appl. No.: 12/481,032

(22) Filed: Jun. 9, 2009

(65) Prior Publication Data
US 2009/0245737 A1 Oct. 1, 2009

Related U.S. Application Data

(63) Continuation of application No. 11/940,015, filed on Nov. 14, 2007, now Pat. No. 7,559,702, which is a continuation of application No. PCT/JP2006/310036, filed on May 19, 2006.

(30) Foreign Application Priority Data

May 19, 2005 (JP) .................................. 2005-146698

(51) Int. Cl.
*G02B 6/36* (2006.01)
(52) U.S. Cl. ....................................................... 385/92
(58) Field of Classification Search .................... None
See application file for complete search history.

(56) References Cited

U.S. PATENT DOCUMENTS

| 4,439,006 A | 3/1984 | Stevenson |
| 7,559,702 B2 * | 7/2009 | Fujiwara et al. ............... 385/88 |
| 2004/0202477 A1 | 10/2004 | Nagasaka et al. |
| 2004/0234210 A1 * | 11/2004 | Nagasaka et al. ............... 385/88 |

FOREIGN PATENT DOCUMENTS

| JP | 11-64682 A | 3/1999 |
| JP | 11-84174 A | 3/1999 |
| JP | 11-119055 A | 4/1999 |
| JP | 2000-292658 A | 10/2000 |
| JP | 2004-246279 A | 9/2004 |
| WO | 2004/097481 A1 | 11/2004 |

OTHER PUBLICATIONS

Takeshi Sasaki et al. "System LSI Module with Optical I/O Interfaces (5) Development of PETIT Connector" The Institute of Electronics, Information and Communication Engineers Electronics Society Taikai Koen Ronbunshu, Sep. 2003, p. 260.

* cited by examiner

*Primary Examiner* — Sung Pak
(74) *Attorney, Agent, or Firm* — Sughrue Mion, PLLC

(57) ABSTRACT

A connector holder fixes an optical connector assembled at a leading end of an optical fiber to an optical module having a light input/output end so that the optical fiber and the light input/output end is optically connected. The connector holder is provided with a holding section for storing at least a part of the optical connector, and a cover section attached to the holding section to be freely opened and closed. The cover section is provided with a cover section main body, and a pressing section which presses the optical connector toward the optical module.

14 Claims, 12 Drawing Sheets

US 8,083,418 B2

CONNECTOR HOLDER, OPTICAL-ELECTRICAL CONVERTER WITH ATTACHED CONNECTOR HOLDER, OPTICAL CONNECTOR FIXING STRUCTURE AND CONNECTOR HOLDER ASSEMBLY METHOD

TECHNICAL FIELD

The present invention relates to a structure in which an optical connector that is assembled onto a distal end of an optical fiber is fixed onto a substrate that is provided with an optical input-output terminal such that the optical fiber and the optical input-output terminal are optically connected, and also to a connector holder and an optical-electrical converter with an attached connector holder that are used in this structure, and also a method of assembling a connector holder.

Priority is claimed on Japanese Patent Application No. 2005-146698, filed May 19, 2005, the contents of which are incorporated herein by reference.

BACKGROUND ART

FIG. 15 shows a conventional optical connector fixing structure. In this structure, an optical connector 102 that is provided on a distal end of an optical fiber 101 is fixed onto a substrate 105 via a package 103 and a connector installation frame 104 (see Patent Document 1).

In the connector 102, signal light is directed downwards by a sloping surface 102a (i.e., a reflective surface), and is directed towards an interface device 106 on the substrate 105.

A pair of guide pin insertion holes 102b are formed in the connector 102. The connector 102 is positioned on the connector installation frame 104 as a result of guide pins 107 that are provided on the connector installation frame 104 being inserted into the guide pin insertion holes 102b.

A connector holding frame 108 which has guide pin insertion holes 108a is provided on the connector 102. The connector holding frame 108 is screwed to the package 103 with the guide pins 107 in a state of being inserted in the guide pin insertion holes 108a.

Patent document 1: Japanese Patent Application Laid-Open (JP-A) No. 2000-292658

DISCLOSURE OF THE INVENTION

Problems to be Solved by the Invention

However, in the above described structure, the problem exists that it is a complex operation to fix the connector to the installation frame or remove it therefrom.

The present invention was conceived in view of the above described circumstances and it is an object thereof to provide an optical connector fixing structure that makes it possible to accurately position an optical connector and that has excellent operability, and a connector holder and an optical-electrical converter with an attached connector holder that are used in this structure, and also a method of assembling a connector holder.

Means for Solving the Problem

The connector holder of the present invention is a connector holder that fixes onto a substrate on which an optical input-output terminal has been provided an optical connector that is assembled onto a distal end of an optical fiber whose optical axis direction is different from an optical axis direction of the optical input-output terminal such that the optical fiber and the optical input-output terminal are optically connected, wherein there are provided a holding portion that houses the optical connector, and a lid portion that is mounted on the holding portion such that it can open and close freely, and wherein the lid portion is provided with a lid portion body, and a pressing portion that presses the optical connector towards the substrate.

In the connector holder of the present invention, it is preferable for the lid portion body to be provided with an engaging portion that engages with the holding portion when the pressing portion is pressing optical connector.

In the connector holder of the present invention, it is preferable for the pressing portion to be formed in the shape of a tongue piece that is able to undergo elastic deformation, and for the optical connector to be pressed by elasticity towards the substrate.

In the connector holder of the present invention, it is preferable for a holder base portion to be provided between the substrate and the holder portion, and for the optical connector to be fixed to this holder base portion.

In the connector holder of the present invention, it is preferable for positioning pins to be provided on the holder base portion, and for the optical connector to be fixed as a result of the positioning pins being engaged in pin holes in the optical connector.

In the connector holder of the present invention, it is also possible for pin holes to be formed in the holder base portion, and for the optical connector to be fixed as a result of positioning pins that are provided on the optical connector being engaged in the pin holes.

The optical-electrical converter having an attached connector holder of the present invention is provided with a connector holder that fixes onto an optical-electrical converter on which an optical input-output terminal has been provided an optical connector that is assembled onto a distal end of an optical fiber whose optical axis direction is different from an optical axis direction of the optical input-output terminal such that the optical fiber and the optical input-output terminal are optically connected, and with an optical-electrical converter, wherein the connector holder is provided with a holding portion that houses the optical connector, and a lid portion that is mounted on the holding portion such that it can open and close freely, and wherein the lid portion is provided with a lid portion body, and a pressing portion that presses the optical connector towards the substrate.

The optical connector fixing structure of the present invention is a structure that fixes onto a substrate on which an optical input-output terminal has been provided an optical connector that is assembled onto a distal end of an optical fiber whose optical axis direction is different from an optical axis direction of the optical input-output terminal such that the optical fiber and the optical input-output terminal are optically connected, wherein the connector holder is provided with a holding portion that houses the optical connector, and a lid portion that is mounted on the holding portion such that it can open and close freely, and wherein the lid portion is provided with a lid portion body, and a pressing portion that presses the optical connector towards the substrate.

The connector holder assembly method of the present invention is a method of assembling the above described connector holder and is a method in which the holding portion and the holder base portion are molded separately and are then joined together.

In the connector holder assembly method of the present invention, it is possible, after the holder base portion has been positioned relative to the substrate, for the holding portion to be joined to this holder base portion.

In the connector holder assembly method of the present invention, it is also possible, after the holding portion has been joined to the holder base portion, for the holder base portion to be positioned relative to the substrate.

The connector holder assembly method of the present invention is a method of assembling the above described connector holder and is a method in which it is also possible for the holding portion and the holder base portion to be molded integrally into a single unit.

The holder base portion of the present invention has a positioning device that is interposed between a holding portion, which holds an optical connector and is part of a connector holder that fixes a substrate on which an optical input-output terminal has been provided and an optical fiber such that they are optically connected via an optical connector that is placed on an distal end of the optical fiber, and a substrate, and positions the optical connector relative to the substrate.

In the holder base portion of the present invention, it is preferable for the positioning device to be formed by positioning pins that are formed on a base body portion, and for the positioning pins to engage with pin holes that are formed in the optical connector.

The lid portion of the present invention is a lid portion that is mounted such that it can open and close freely on a holding portion which holds an optical connector and is part of a connector holder that fixes a substrate, on which an optical input-output terminal has been provided, and an optical fiber such that they are optically connected together via the optical connector that is placed on an distal end of the optical fiber, wherein a lid portion body presses the optical connector towards the substrate.

It is preferable for the lid portion body of the present invention to be provided with engaging portions that engage with the holding portion when the pressing portion is in a state of pressing the optical connector.

It is preferable for the lid portion body of the present invention to be provided with a top plate portion that is formed by a substantially rectangular main body portion and an operating portion that extends forwards from a front edge of the main body portion, and by side plate portions that are formed on both side edges of the top plate portion and are pivotably mounted on the holding portion of the connector holder.

Effects of the Invention

In the connector holder of the present invention, because there is provided a lid portion having a pressing portion that presses an optical connector towards a substrate, the optical connector is held by the pressing portion. Because of this, the optical connector is placed in a position close to the substrate, and it is difficult for the position of the optical connector relative to the substrate to change.

Accordingly, it is possible to accurately position an optical connector and ensure satisfactory optical characteristics (i.e. regarding optical loss and the like), and optically connect an optical fiber to an optical input-output terminal.

Moreover, in the connector holder of the present invention, because it is possible to accurately position an optical connector by closing the lid portion when the optical connector has been fitted into the holding portion, the operation to fix the optical connector is simplified. Furthermore, because the optical connector can be exposed by opening the lid portion, removal of the optical connector is simplified. Accordingly, there is excellent operability when both fixing and removing an optical connector.

DESCRIPTION OF THE REFERENCE NUMERALS

1 . . . Circuit board, 2 . . . Optical module, 3 . . . Connector holder, 4 . . . Optical connector, 5 . . . Optical fiber, 6 . . . Optical element (optical input-output terminal, 11 . . . Holding portion, 12 . . . Lid portion, 31 . . . Lid portion body, 32 . . . Pressing portion, 36 . . . Engaging portion

BEST MODE FOR CARRYING OUT THE INVENTION

Figure 1:
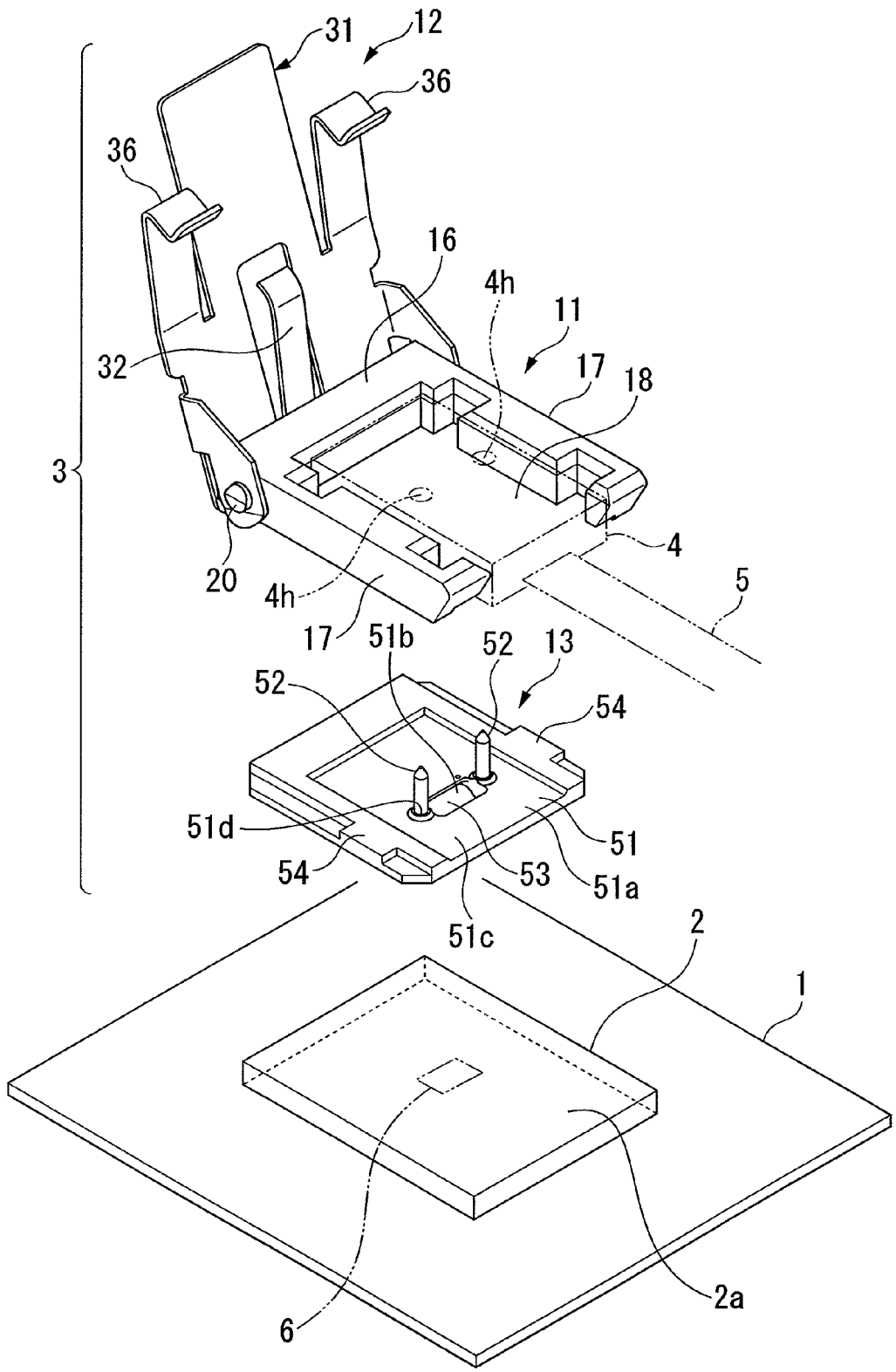
FIG. 1 is an exploded perspective view showing an example of the optical connector fixing structure according to the present invention.
Figure 2A:
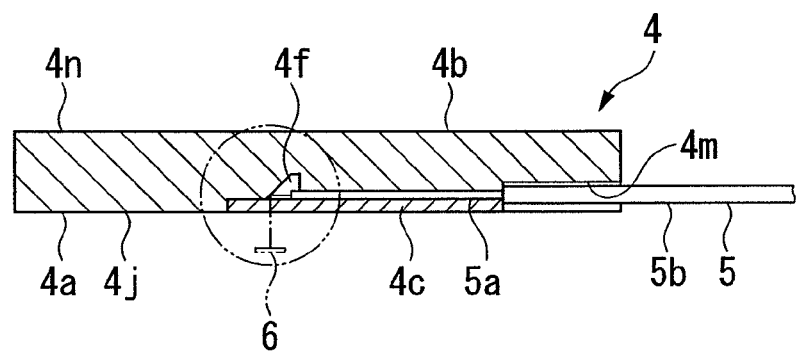
FIG. 2A is a cross-sectional view showing the optical connector shown in FIG. 1.
Figure 2B:
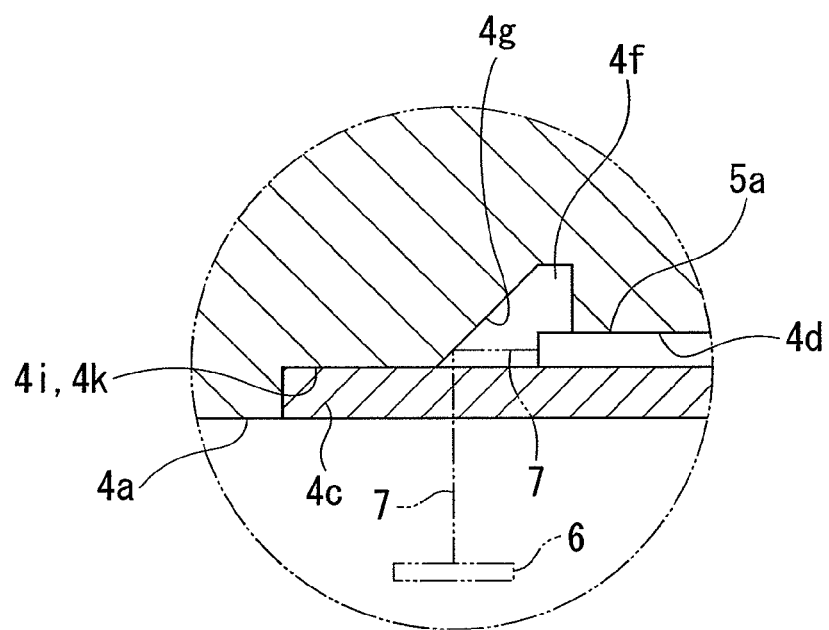
FIG. 2B is a cross-sectional view showing principal portions of the optical connector shown in FIG. 1.

FIG. 1 is an exploded perspective view showing an example of the optical connector fixing structure according to the present invention. FIG. 2A is a cross-sectional view showing the optical connector shown in FIG. 1, while FIG. 2B is an enlarged view showing principal portions of FIG. 2A.

In FIG. 1 through FIG. 10, the symbol 1 is a circuit board, 2 is an optical module (i.e., an optical-electrical converter), 3 is a connector holder, 4 is an optical connector, and 5 is an optical fiber.

In the present invention, the term 'substrate' refers to an entire package object on which an optical terminal which is an optical input-output terminal is packaged and, in the example shown in the drawings, corresponds to the circuit board 1 and the optical module 2. Moreover, the term 'optical-electrical converter with attached connector holder' corresponds to the optical module 2 and the connector holder 3.

(Optical Connector)

As is shown in FIG. 1 and FIGS. 2A and 2B, the optical connector 4 is assembled onto a distal end of the optical fiber 5, and has a block-shaped connector body 4b which is made from synthetic resin, and a glass plate 4c which is fixed to the connector body 4b.

The glass plate 4c sandwiches between itself and the connector body 4b an optical fiber 5a (i.e., a bare optical fiber) which has been exposed by having the covering at the end of the optical fiber 5 removed, and thereby fixes the optical fiber 5a.

A pair of pin holes 4h are formed in the connector body 4. The accuracy of the positioning of the optical connector 4 relative to the optical module 2 is ensured by positioning pins 52 that are provided in a holder base portion 13 (described below) being engaged with the pin holes 4h by being inserted therein.

A recessed portion 4f that is hollowed out from a joining surface 4a side and is used to alter the optical axis is formed in the connector body 4b.

An optical multi fiber tape core wire having multiple cores can be taken as an example of the optical fiber 5. A plurality of optical fibers 5a (i.e., bare optical fibers) which are exposed as a result of the coating at the distal end of the optical fiber 5 being removed are arranged in parallel rows within positioning grooves 4d that are formed in a plurality of parallel rows in a bottom surface 4k of a mounting recessed portion 4i.

The optical fibers 5a are precisely positioned by the positioning grooves 4d so as to lie opposite a reflective portion 4g of the optical axis altering recessed portion 4f. The respective optical fibers 5a are positioned in parallel with the joining surface 4a of the optical connector 4 by the positioning grooves 4d and the glass plate 4c.

A covered portion 5b of the optical fiber 5 is housed in a covering housing groove 4m that is formed in a bottom surface 4j of the connector body 4b, and is fixed to the connector body 4b by an adhesive agent or the like.

The optical fiber 5 is not limited to an optical multi fiber tape core wire having multiple cores and it is also possible to employ a variety of structures such as, for example, a single-core optical fiber core wire or the like.

The optical fiber (specifically, the bare optical fiber) that is used with the optical connector 4 is, for example, a quartz-based optical fiber, however, it is not limited to this. In addition, a GI (wherein GI=graded-index) type of optical fiber and the like can be used as an example of a quartz-based optical fiber, however, it is not limited to this.

The distal end of each optical fiber 5a is inserted into an optical axis altering recessed portion 4f of the optical connector 4, and is placed so as to face the reflective portion 4g that is formed inside the optical axis altering recessed portion 4f.

The optical axis altering recessed portion 4f is formed in a groove shape that has been hollowed out in the bottom surface 4j of the connector body 4b. Specifically, the optical axis altering recessed portion 4f is formed in a groove shape that has been hollowed out in the bottom surface 4k of the mounting recessed portion 4i of the glass plate.

The reflective portion 4g is formed by coating a metallized film or the like on an inner wall surface of the optical axis altering recessed portion 4f which is located on an extension of the optical axis of the distal end of the optical fibers 5a that are inserted into the optical axis altering recessed portion 4f. The reflective portion 4g forms a reflective surface that is tilted, for example, approximately 45 degrees relative to the joining surface 4a of the optical connector 4. The inner wall surface where the reflective portion 4g is provided faces, via the optical axis altering recessed portion 4f, a wall portion (i.e., a portion of the connector body 4b) on the side where the positioning grooves 4d are formed, and this inner wall surface slopes such that, as it moves from the joining surface 4a side of the connector body 4 towards a rear surface 4n side thereof, it approaches the wall portion on the side where the positioning grooves 4d are provided.

The reflective portion 4g is positioned on the optical element 6 of the optical module 2 when the optical connector 4 is placed on the optical module 2, and faces either the light emitting surface or the light receiving surface of the optical element 6 so as to function as an optical axis altering portion that forms an optical path that optically connects the optical element 6 to the optical fibers 5a.

The reflective portion 4g which forms a reflective surface which is tilted 45 degrees relative to the joining surface 4a of the optical connector 4 shown in the drawings is tilted 45 degrees relative to the direction of the optical axis of the optical fibers 5a, and is also tilted 45 degrees relative to the direction of the optical axis of the optical element 6 which is perpendicular to the top surface 2a of the optical module 2.

Accordingly, the reflective portion 4g functions as a mirror that bends by 90 degrees outgoing light that is emitted from the distal ends of the optical fibers 5a so that it is irradiated onto the optical element 6, and bends by 90 degrees outgoing light that is emitted from the optical element 6 so that it is irradiated onto the optical fibers 5a.

The portion of the optical path 7 that is located between the reflective portion 4g and the optical element 6 is tilted (i.e., is perpendicular thereto in the example in the drawings) relative to the circuit board 1 (more accurately, relative to a direction in which the circuit board extends).

The optical connector 4 has a function of optically connecting the optical element 6 and the optical fibers 5a which extend in a substantially perpendicular direction relative to the direction of the optical axis of the optical path connecting the optical connector 4 and the optical element 6.

Namely, the optical element 6 is optically connected by means of the optical connector 4 to the optical fiber 5 which has a different optical axis direction. Specifically, the optical fiber 5 is optically connected by means of the optical connector 4 to the optical element 6 that has an optical axis direction that is tilted relative to the optical axis direction of the optical fiber 5.

In the present invention, it is sufficient if the optical axis altering portion of the optical connector is able to optically connect an optical input-output terminal and an optical fiber that has an optical axis direction that is different from the optical axis direction of the optical input-output terminal, and is not limited to the metallized film shown in the example in the drawings. Namely, a variety of structures can be employed.

The angle of inclination of the reflective portion 4g relative to the joining surface 4a of the optical connector 4 is not restricted to 45 degrees. It is sufficient if the reflective portion 4g forms an optical path that is bent between the optical element 6 and the distal end of the optical fiber 5 which is fixed to the optical connector 4 so as to make possible an optical connection between the optical fiber 5 and the optical element 6, and the angle of inclination relative to the joining surface 4g of the optical connector 4 can be appropriately set within a range whereby the reflective portion 4g fulfills this function.

(Connector Holder)

The connector holder 3 has the function of fixing the optical connector 4 onto the optical module 2, and preventing the optical connector 4 shifting its position on the optical module 2.

FIG. 1 shows an example of the connector holder according to the present invention. The connector holder 3 shown here is provided with a holding portion 11 that houses at least a portion of the optical connector 4, a lid portion 12 that is mounted on the holding portion 11 such that it can be freely opened and closed, and a holder base portion 13 that is provided on a bottom surface side of the holding portion 11.

Figure 3A:
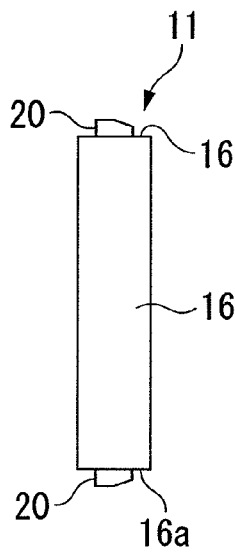
FIG. 3A is a rear view showing a holding portion of the connector holder shown in FIG. 1.
Figure 3B:
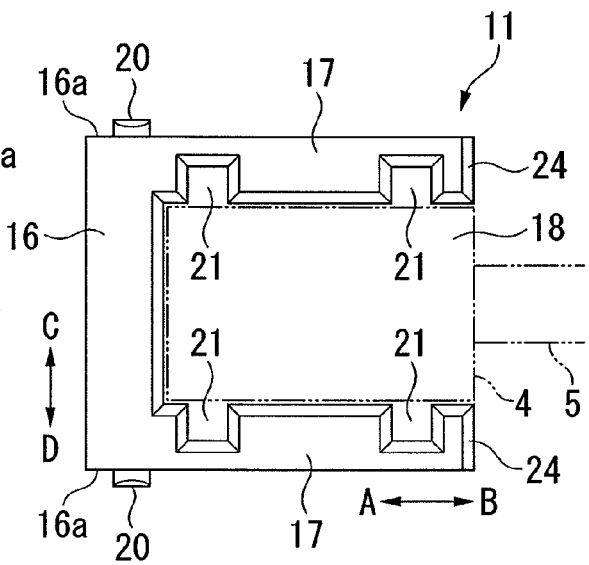
FIG. 3B is a top view showing the holding portion of the connector holder shown in FIG. 1.
Figure 3C:
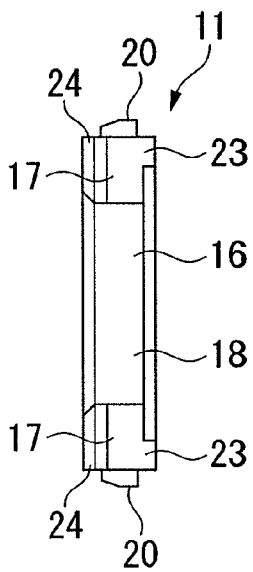
FIG. 3C is a front view showing the holding portion of the connector holder shown in FIG. 1.
Figure 3D:
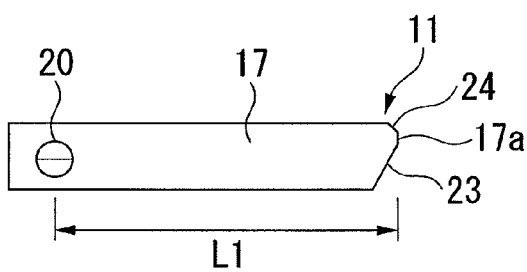
FIG. 3D is a side view showing the holding portion of the connector holder shown in FIG. 1.
Figure 3E:
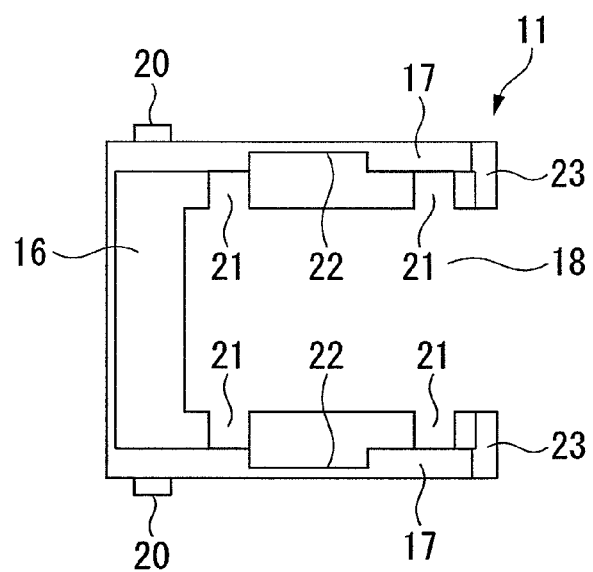
FIG. 3E is a bottom view showing the holding portion of the connector holder shown in FIG. 1.

FIGS. 3A to 3E are views showing the structure of the holding portion 11. FIG. 3A is a rear view, FIG. 3B is a top view, FIG. 3C is a front view, FIG. 3D is a side view, and FIG. 3E is a bottom view. In the description given below, the direction A shown in FIG. 3B is taken as the rear direction, while the direction B is taken as the front direction. A direction towards a person observing FIG. 3B is taken as the up direction, while a direction away from a person observing FIG. 3B is taken as the down direction.

The holding portion 11 is a substantially U-shaped frame that has a rod-shaped main portion 16 and arm portions 17 that protrude substantially perpendicularly to the main portion 16 from both ends in the longitudinal direction of the main portion 16. An area between the two arm portions 17 forms a housing portion 18 where the optical connector 4 is engaged.

The material that forms the holding portion 11 is not particularly limited, however, preferably it is made from synthetic resin.

Shaft portions 20 that rotatably support the lid portion 12 are formed at both end surfaces 16a of the main portion 16. In the example shown in the drawings, the shaft portions 20 are shaped substantially like circular columns, and are formed so as to protrude towards the side from the two end surfaces 16a.

The arm portions 17 are formed substantially parallel with each other, and the length thereof and the distance between them are fixed such that the optical connector 4 can be properly positioned when the optical connector 4 is fitted into the housing portion 18.

As is shown in FIG. 3B, the holding portion 11 is formed such that the optical connector 4 is enclosed by the main portion 16 and the arm portions 17, and a major portion of the optical connector 4 is able to be housed within the housing portion 18.

The holding portion 11 fulfills the function of housing and positioning the optical connector 4, and may be formed such that it is only able to house a portion of the optical connector 4 or may be formed such that it is able to house the entire optical connector 4. In the example shown in the drawings, because a portion of the front end portion of the optical connector 4 is positioned to the front of front surfaces of the arm portions 17, only a portion of the optical connector 4 is being housed in the holding portion 11 (see FIG. 8).

Top portions of the front end portions of the arm portions 17 form top portion sloping surfaces 24 that slope gradually forwards as they move down. Bottom portions of the front end surfaces of the arm portions 17 form bottom portion sloping surfaces 23 that slope gradually backwards as they move down.

Recessed portions 21 that face the housing portion 18 are formed in inner side surfaces of the arm portions 17. The recessed portions 21 are formed in order to allow protruding pieces of a removal tool (described below) that is used when the optical connector 4 is being removed from the connector holder 3 to be inserted therein. In the example shown in the drawings, one recessed portion 21 is formed in the front portion and the rear portion respectively of each arm portion 17.

As is shown in FIG. 3E, a positioning recessed portion 22 is formed in a bottom surface side of each arm portion 17.

As is shown in FIG. 3D, the distance between a front end 17a of the arm portions 17 and a center axis of the shaft portions 20 is taken as a distance L1.

Figure 4A:
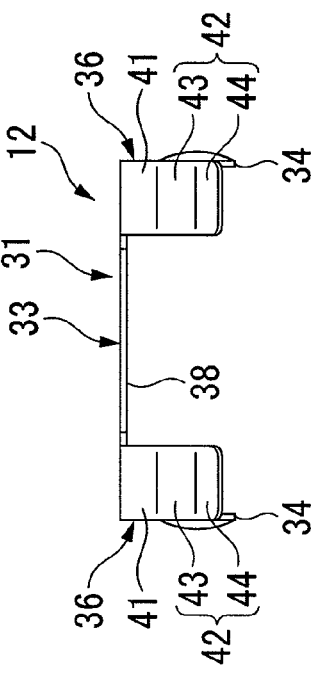
FIG. 4A is a top view showing a lid portion of the connector holder shown in FIG. 1.
Figure 4B:
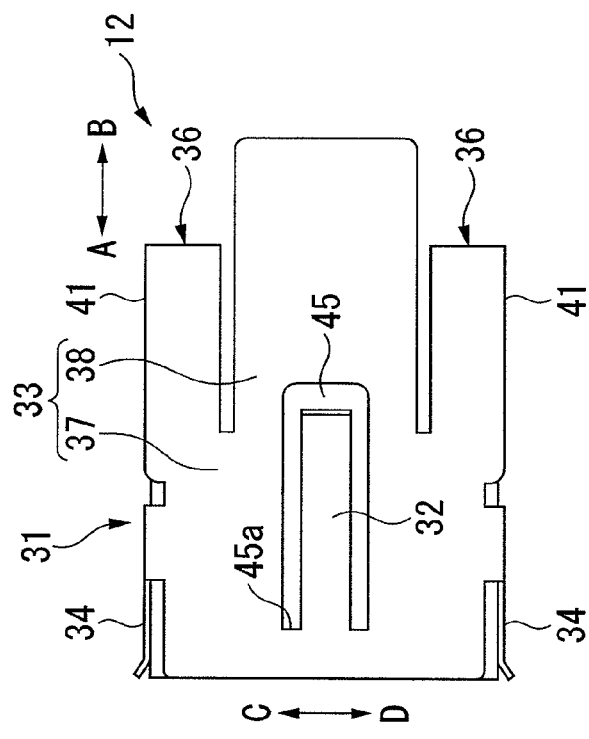
FIG. 4B is a side view showing the lid portion of the connector holder shown in FIG. 1.
Figure 4C:
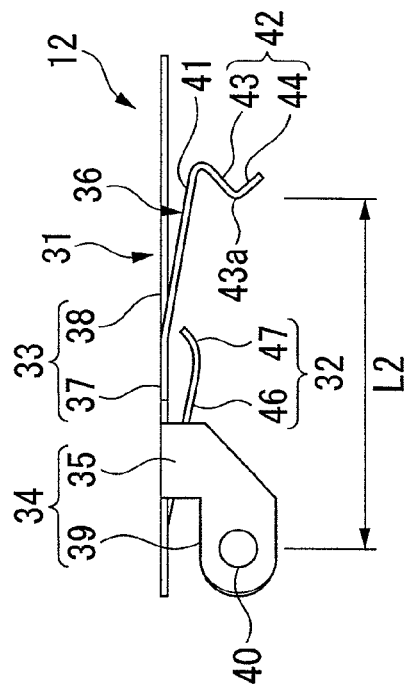
FIG. 4C is a front view showing the lid portion of the connector holder shown in FIG. 1.

FIGS. 4A to 4C show the structure of the lid portion 12. FIG. 4A is a top view, FIG. 4B is a side view, and FIG. 4C is a front view. The direction A shown in FIG. 4A is taken as the rear direction, while the direction B is taken as the front direction. The direction CD is taken as the transverse direction.

The lid portion 12 is provided with a lid portion body 31 and a pressing portion 32 that presses the optical connector 4 towards the optical module 2.

The lid portion 12 is preferably made from metal, however, it may also be made from another material such as, for example, synthetic resin.

The lid portion body 31 is provided with a top plate portion 33, side plate portions 34 that are formed on both side edges of the top plate portion 33, and plate-shaped engaging portions 36 that extend out from the top plate portion 33.

The top plate portion 33 is provided with a substantially rectangular plate-shaped main body portion 37, and an operating portion 38 that extends forwards from a front edge of the main body portion 37.

The operating portion 38 is formed in a plate shape whose width is narrower than that of the main body portion 37, and is formed so as to extend forwards from a center portion in the transverse direction of the front end of the main body portion 37.

An aperture portion 45 is formed in the top plate portion 33. The aperture portion 45 is formed in a rectangular shape whose longitudinal direction is aligned in the front-rear direction (i.e., the A-B direction in the drawings).

The side plate portions 34 are formed substantially perpendicularly to the top plate portion 33, and are each provided with a downward extending portion 35 that extends downwards from a side edge of the top plate portion 33, and a rearward extending portion 39 that extends rearwards from a bottom edge of the downward extending portion 35.

A shaft bearing portion 40 which is a circular aperture portion in which the shaft portion 20 of the holding portion 11 is engaged is formed in each rearward extending portion 39.

As a result of the shaft bearing portion 40 being engaged with the shaft portion 20, the lid portion 12 is joined by hinges to the holding portion 11 so that the lid portion 12 is able to pivot using the shaft bearing portion 40 as a fulcrum. Because of this, the lid portion 12 is mounted on the holding portion 11 such that it is able to open and close.

Note that it is sufficient if the lid portion and the holding portion are joined together such that they are able to pivot, and the structure of this join is not limited to the example shown in the drawings. For example, it is also possible to join together the lid portion and the holding portion via a thin-walled portion which is formed so as to be freely bendable.

The engaging portions 36 are provided with an extending portion 41 that extends forwards from the front edge of the main body portion 37 while sloping gradually downwards, and an engaging claw portion 42 that is formed on a front end of the extending portion 41.

The engaging claw portions 42 are provided with a claw portion body 43 that slopes downwards and gradually rearwards from the front end of the extending portion 41, and a distal end portion 44 that slopes downwards and gradually forwards from a bottom edge of the claw portion main body 43, and is formed such that it can undergo elastic bending deformation.

Because the distal end portions 44 extend diagonally downwards, if the distal end portions 44 are pressed upwards in order to open the lid portion 12, then force is applied in the direction of opening (i.e., towards the front) to the engaging claw portions 42. As a result, the engagement between the engaging claw portions 42 and the lid portion 17 is loosened, and it becomes easy to pivot the lid portion 12 in the opening direction (i.e., in an anticlockwise direction in FIG. 4).

A distance L2 (see FIG. 4B) between a bottom end 43a of the claw portion main body 43 and the center of the shaft bearing portion 40 is preferably slightly smaller than the distance L1 (see FIG. 3D) between the front ends 17a of the arm portions 17 of the holding portion 11 and the center axis of the shaft portions 20.

The engaging portions 36 are provided respectively on the two sides of the operating portion 38, namely, on the C direction side and the D direction side of the operating portion 38.

The pressing portion 32 is a tongue-shaped plate body that is able to undergo elastic bending deformation, and extends substantially forwards from a rear edge 45a of the aperture portion 45 which is formed in the top plate portion 33.

Because the pressing portion 32 extends substantially forwards from the rear edge 45a of the aperture portion 45, compared with a structure in which it extends towards the rear from a front edge of the aperture portion 45, the elastic force of the operating portion 38 can be strengthened, and stability in the opening and closing of the lid portion 12 can be obtained.

The pressing portion 32 is provided with a main portion 46 that extends forwards and gradually downwards from the rear edge 45a of the aperture portion 45, and with a distal end portion 47 that extends forwards and gradually upwards from a front end of the main portion 46.

When the engaging portions 36 of the lid portion 12 are engaged with the holding portion 11, the pressing portion 32 is placed in a state of elastic bending deformation against the optical connector 4, and presses the optical connector 4 against the optical module 2 due to the elastic restorative force thereof.

It is preferable for the pressing portion 32 to be placed against the optical connector 4 at a position which corresponds to a point directly above the optical element 6. This is because, in order to prevent the distance between the optical element 6 and the optical connector 4 varying when external force is applied via the optical fiber 5 to the optical connector 4, it is most effective if a position which corresponds to a point directly above the optical element 6 is pressed down.

The position where the pressing portion 32 is placed against the optical connector 4 may be in the vicinity of the pin holes 4h and may, for example, be between the two pin holes 4h.

It is preferable for the pressing portion 32 to be formed such that it engages with a projecting portion (not shown) which is formed on the top surface of the optical connector 4. It is possible to improve positioning accuracy if this structure is employed.

It is preferable for the pressing portion 32 to be formed integrally with the lid portion body 31. For example, by forming the lid portion 12 that is provided with the lid portion body 31 and the pressing portion 32 from a single plate component, a lid portion 12 is obtained in which the pressing portion 32 and the lid portion body 31 are an integrated unit.

If the extending portions 41 of the engaging portions 36 are too long, there is a possibility that it will become difficult for the lid portion 12 to be separated from the holding portion 11 during an operation to open the lid portion 12. This is because of the following reason.

In order to open the lid portion 12 when the distal end portions (i.e., the engaging claw portions 42) of the engaging portions 36 are engaged with the holding portion 11, force is applied in an upward direction to the operating portion 38 of the top plate portion 33. As a result, force is applied in an upward direction to the engaging portions 36, and the engaging claw portions 42 undergo bending deformation in the opening direction (i.e., towards the front) and ride over the front ends 17a of the arm portions 17.

If the extending portions 41 are formed excessively long, then the extending portions 41 are bent too much by the upward force, and the inclination of the portions closest to the distal end portion is too large. In conjunction with this, it becomes difficult for bending deformation to occur in the opening direction of the engaging claw portions 42 and there is a sizable increase in resistance when the engaging claw portions 42 ride over the front ends 17a of the arm portions 17. Because of this, it becomes difficult for the lid portion 12 to be separated from the holding portion 11.

In order to avoid this, it is preferable for the extending portions 41 of the engaging portions 36 to be formed as short as possible.

Figure 16:
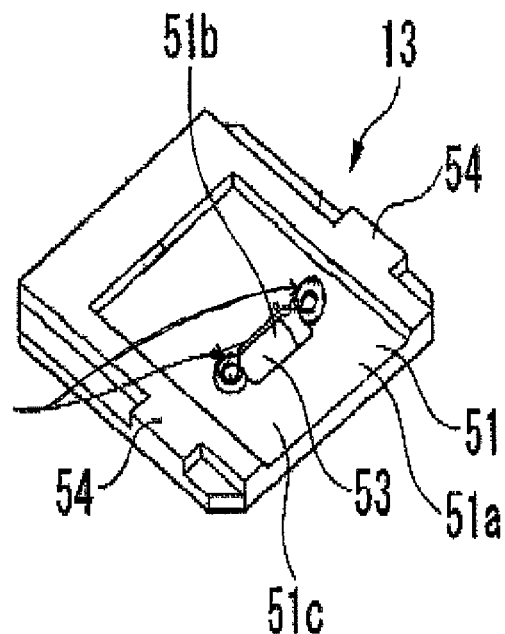
FIG. 16 is another exemplary view of the optical connector fixing structure according to the present invention.
Figure 16:
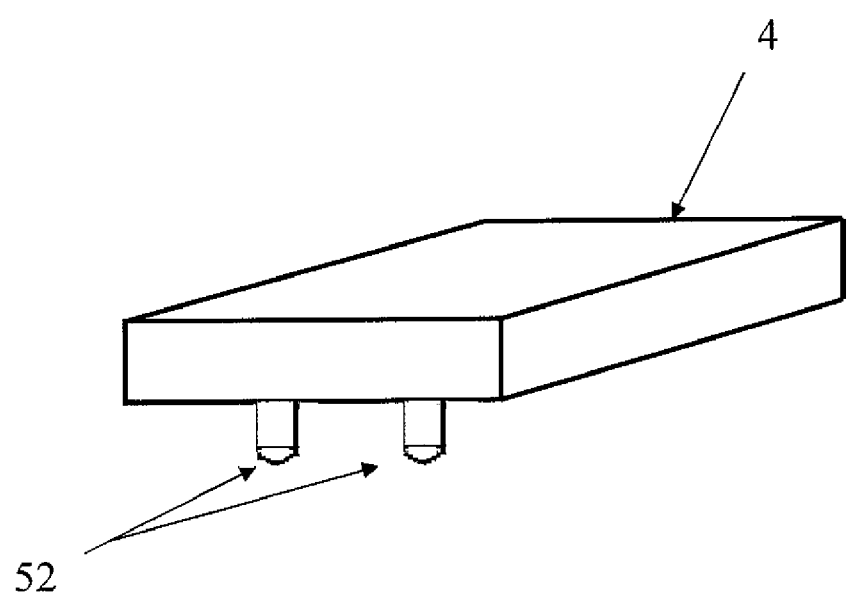

As is shown in FIG. 1, the holder base portion 13 is provided with a plate-shaped base body portion 51, a pair of positioning pins 52 (i.e., positioning devices) that are formed on a top surface 51a of the base body portion 51, a lens 53 that is provided in an aperture portion 51b that is formed in the base body portion 51, and positioning protruding portions 54 that are formed on the base body portion 51. In another exemplary embodiment shown in FIG. 16, the pair of positioning pins 52 are formed on the optical connector 4 and the pin holes 4h are formed on the holder base portion 13.

The positioning pins 52 are separated from each other in the transverse direction and are provided so as to protrude upwards, and are formed such that they can be inserted into the pin holes 4h of the optical connector 4 that is engaged with the holding portion 11.

The lens 53 is formed at a position that allows light traveling from the optical fibers 5a towards the optical element 6 to pass therethrough, and that allows light traveling from the optical element 6 towards the optical fibers 5a to pass therethrough.

The positioning protruding portions 54 are able to be engaged with the positioning recessed portions 22 of the holding portion 11, which enables them to position the holding portion 11 relative to the holder base portion 13.

The holder base portion 13 is mounted on the top surface 2a of the optical module 2.

The holder base portion 13 can also be formed as a single unit together with the holding portion 11.

(Optical Module)

The optical module 2 is a chip-type or array-type of module in which optical elements which are light emitting elements such as semiconductor lasers (for example, laser diodes: LD) or the like, or light receiving elements such as photodiodes (PD) or the like are mounted.

The optical module 2 has a function of driving a light emitting element (i.e., the optical element 6) based on control signals from a drive circuit on the circuit board 1, and/or has a function of transmitting electrical signals that correspond to photodetection signals from a photodetector (i.e., the optical element 6) to a processing circuit on the circuit board 1.

The optical module 2 extends in a parallel direction with the circuit board 1.

The optical element 6 functions as the optical input-output terminal of the present invention.

The optical axis of the optical element 6 extends in a direction perpendicular to the circuit board 1. It is sufficient if the optical element 6 has an optical axis direction which is different from the optical axis direction of the optical fiber 5 of the optical connector 4. Moreover, for example, an end portion or the like of an optical fiber is also included as the optical input-output terminal of the present invention.

The optical module 2 can be electrically connected to a circuit pattern or the like on the circuit board 1 in a ball grid array (BGA) format using connection terminal portions (i.e., solder bumps or the like) that are provided on a bottom surface side of the optical module 2.

(Substrate)

The circuit board 1 on which the optical module 2 is packaged is, for example, a discrete substrate, and is constructed in accordance with requirements depending on the electrical components that are packaged on the circuit board such as a photoelectric conversion circuit, a control processing circuit, an optical signal processing circuit, an optical element drive circuit, a storage circuit, as well as various circuits that control driving of the electrical components on the circuit board. Moreover, as the circuit board, it is also possible for an LSI which has these circuit functions to be mounted if necessary.

Next, an operation of the circuit holder 34 will be described.

Figure 5:
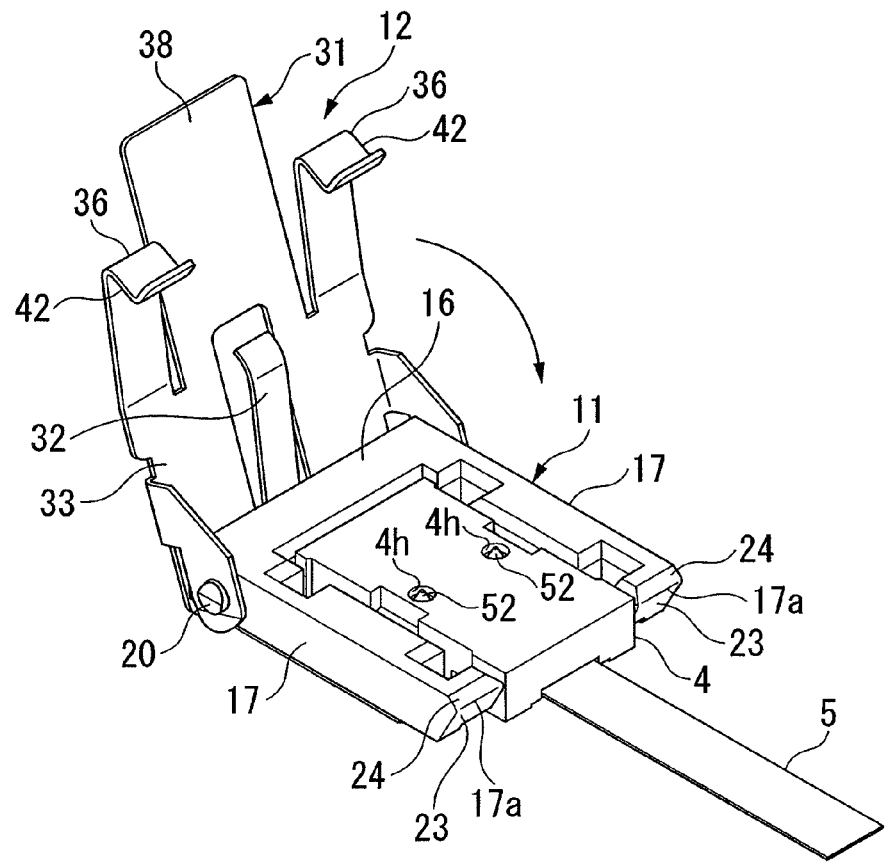
FIG. 5 is a perspective view showing the connector holder shown in FIG. 1.
Figure 6:
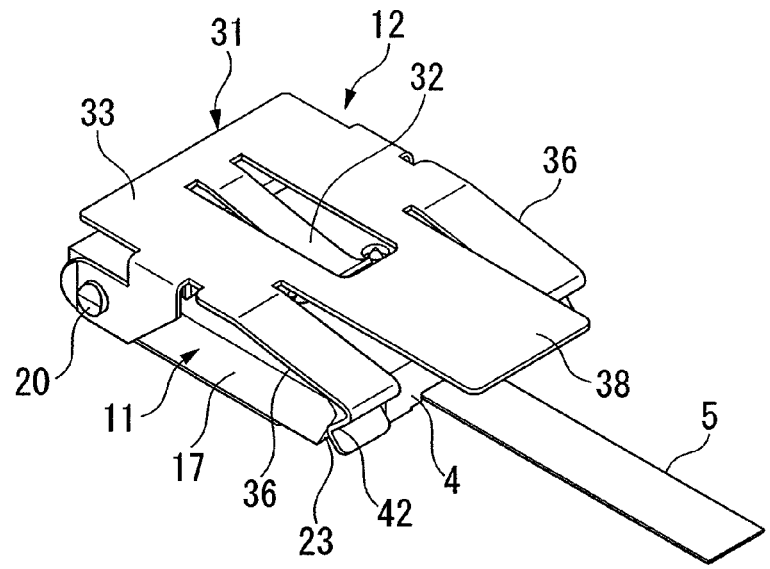
FIG. 6 is a perspective view showing the connector holder shown in FIG. 1.
Figure 7:
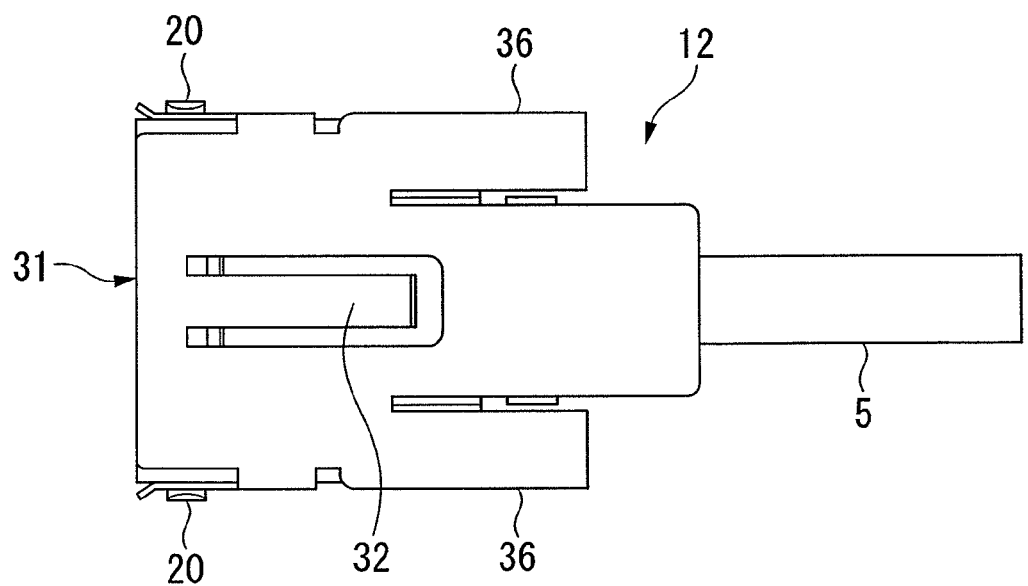
FIG. 7 is a top view showing the connector holder shown in FIG. 1.
Figure 8:
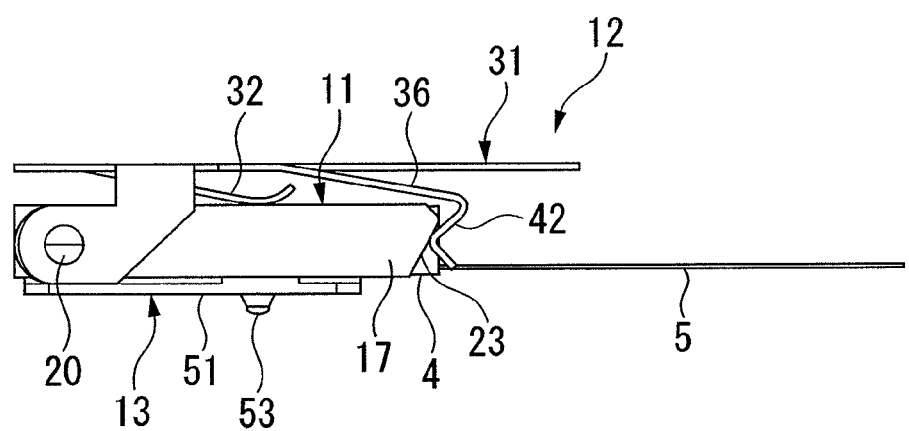
FIG. 8 is a side view showing the connector holder shown in FIG. 1.
Figure 9:
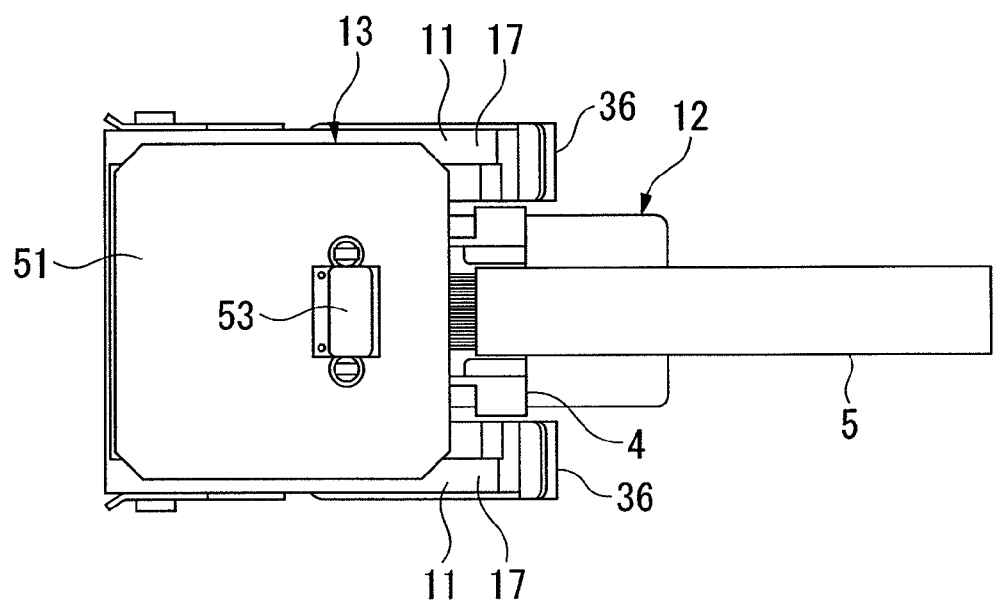
FIG. 9 is a bottom view showing the connector holder shown in FIG. 1.
Figure 10:
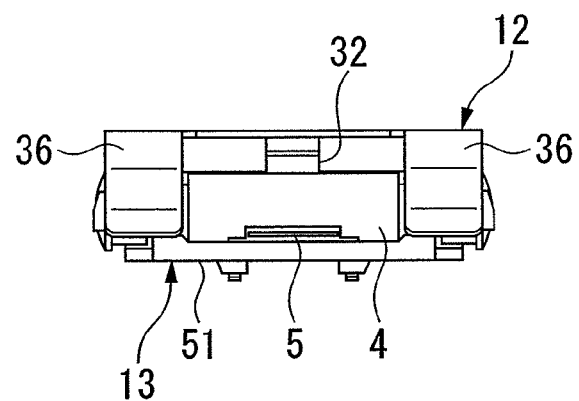
FIG. 10 is a front view showing the connector holder shown in FIG. 1.

As is shown in FIG. 5, when the holding portion 11 has been installed on the holder base portion 13 and the lid 12 has been opened, the optical connector 4 is fitted from the top into the housing portion 18 of the holding portion 11.

By being fitted into the holding portion 11, the optical connector 4 is accurately positioned.

At this time, as a result of the positioning pins 52 being inserted into the pin holes 4h of the optical connector 4, the positioning accuracy of the optical connector 4 is improved even further.

Next, if the lid portion 12 is pivoted downwards using the shaft portions 20 as fulcrums by applying force to the operating portion 38 as is shown by the arrow in the drawings, the pressing portion 32 is placed against the top surface of the optical connector 4.

As has been described above, the distance L2 (see FIG. 4B) between the bottom end 43a of the claw portion main body 43 of the lid portion 12 and the center of the shaft bearing portion 40 is smaller than the distance L1 (see FIG. 3D) between the front ends 17a of the arm portions 17 of the holding portion 11 and the center axis of the shaft portions 20.

Because of this, if the lid portion 12 is pivoted, the engaging claw portions 42 of the lid portion 12 are pressed against the top portion sloping surfaces 24 of the holding portion 11 and, if the lid portion 12 is pivoted still further, the engaging claw portions 42 undergo elastic bending deformation towards the front in accordance with the slope of the top portion sloping surfaces 24 and ride over the front ends 17a of the arm portions 17.

When the engaging claw portions 42 are made by elastic restorative force to arrive at the bottom portion sloping surfaces 23, because pivoting of the lid portion 12 in an upward direction is restricted, the lid portion 12 is placed in a state of being engaged with the holding portion 11.

As is shown in FIG. 6 through FIG. 10, in a state in which the lid portion 12 is engaged with the holding portion 11, the pressing portion 32 is pressed against the optical connector 4 in a state of elastic bending deformation, and because of the elastic restorative force thereof the optical connector 4 is pressed towards the optical module 2.

In this state, because the optical connector 4 is being pressed, the optical connector 4 is placed in a position close to the optical module 2 via the holder base portion 13, and it becomes difficult for the optical connector 4 to move in position relative to the optical module 2.

Because of this, it is possible to accurately position the optical connector 4 and ensure satisfactory optical characteristics (i.e. regarding optical loss and the like), and optically connect the optical fiber 5 to the optical element 6 of the optical module 2.

In order to remove the optical connector 4 from the connector holder 3 the lid portion 12 is pivoted upwards.

At this time, as a result of the engaging claw portions 42 of the engaging portions 36 undergoing elastic bending deformation following the slope of the bottom portion sloping surfaces 23 and riding over the front ends 17a of the arm portions 17, the engagement of the lid portion 12 with the holding portion 11 is released. In this manner, the lid portion 12 can be disengaged from the holding portion 11.

After the portion 12 has been opened, the optical connector 4 is removed from the holding portion 11.

In the above described connector holder 3, because it is possible to accurately position the optical connector 4 by closing the lid portion 12 with the optical connector 4 fitted into the holding portion 11, the operation to fix the optical connector 4 is simplified.

Moreover, because it is possible to expose the optical connector 4 by opening the lid portion 12, removal of the optical connector 4 is simplified.

Accordingly, there is excellent operability when fixing and removing an optical connector 4.

Furthermore, in this connector holder 3, two engaging portions 36 engage with the front surface of the holding portion 11. Because of this, as a result of force being applied in an upward direction to the operating portion 38 which extends towards the front, the engaging claw portions 42 ride over the front ends 17a of the arm portions 17 and make it easy for the engagement to be released. Accordingly, removal of the optical connector 4 can be performed easily.

Figure 11:
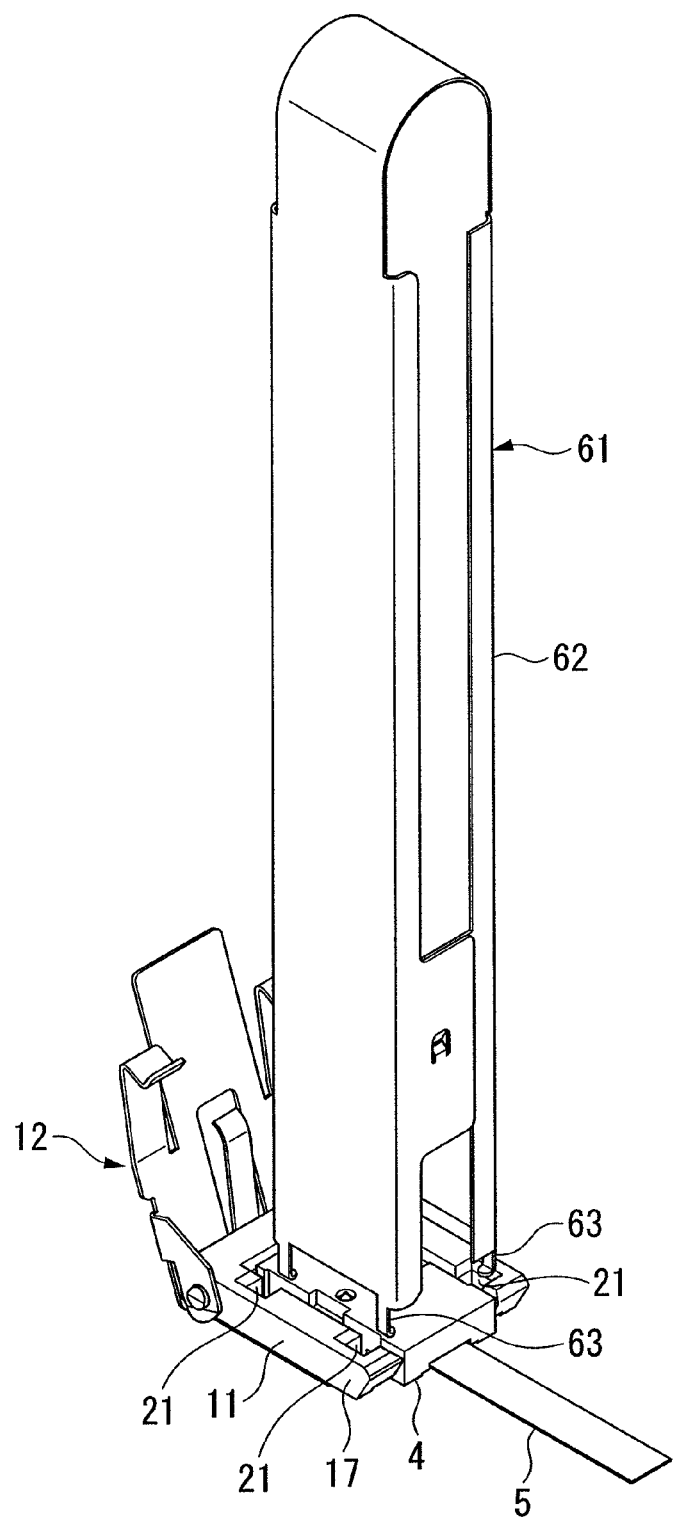
FIG. 11 is a perspective view showing an extraction tool used to remove the optical connector from the connector holder shown in FIG. 1.

FIG. 11 shows an extraction tool that is used to remove the optical connector 4 from the holding portion 11.

In an extraction tool 61, protruding pieces 63 which have hook-shaped engaging pieces are formed at a distal end of a gripping portion 62. By inserting the protruding pieces 63 into the recessed portions 21 of the holding portion 11 and then applying force in an upward direction while the engaging pieces are engaged with the optical connector 4, the optical connector 4 can be removed from the holding portion 11.

Next, a method of manufacturing the connector holder 3 will be described.

When manufacturing the connector holder 3, it is possible to integrally mold the holding portion 11 as a single unit together with the holder base portion 13, or to manufacture these separately and then combine them together. Each method will be described below.

(Separate Molding)

In order to mold the holding portion 11, it is possible to use an injection molding method or to use another molding method, for example, compression molding. The material used for the holding portion 11 may be a thermoplastic resin or maybe a thermosetting resin. Specifically, it is possible to use, for example, an epoxy resin, a polyphenylene sulfide (PPS) resin, a liquid crystal polymer resin, and an ABS resin.

In order to mold the holder base portion 13, it is possible to use an injection molding method or to use another molding method, for example, compression molding. The material used for the holder base portion 13 may be a thermoplastic resin or maybe a thermosetting resin. Specifically, it is possible to use, for example, an epoxy resin, a polyphenylene sulfide (PPS) resin, a liquid crystal polymer resin, and an ABS resin.

The materials used for the holding portion 11 and the holder base portion 13 may be different from each other or may be the same as each other.

In order to connect the optical connector 4 to the holder base portion 13, it is necessary for the holder base portion 13 to have a higher molding accuracy than the holding portion 11.

Because the configuration of the holding portion 11 is complex, the configuration of the metal mold is also complex, however, because the configuration of the holder base portion 13 is comparatively simple, the configuration of the metal mold is also simple. Because of this, a high level of molding accuracy and configuration consistency can be obtained in the holder base portion 13.

When the holding portion 11 and the holder base portion 13 are molded separately, because a high level of molding accuracy and configuration consistency can be obtained in the holder base portion 13 which is connected to the optical connector 4, there is a rise in the positioning accuracy of the optical connector 4.

The positioning pins 52 are inserted into the insertion holes 51*d* that are formed in the top plate portion 51*c* of the base body portion 51 of the holder base portion 13, and are fixed to the base body portion 51. The lens 53 is fitted inside the aperture portion 51*b*.

The holder base portion 13 may be mounted on the optical module 2 after the holding portion 11 has been joined thereto, or else the holding portion 11 may be joined to the holder base portion 13 after the holder base portion 13 has been mounted on the optical module 2. An adhesive agent can be used to join the holding portion 11 to the holder base portion 13.

When the holding portion 11 and the holder base portion 13 are being positioned on the optical module 2, it is possible to employ a method in which the holding portion 11 is joined to the holder base portion 13 after the holder base portion 13 has been positioned on the optical module 2.

Moreover, it is also possible to position the holder base portion 13 relative to the optical module 2 after the holding portion 11 has been joined to the holder base portion 13.

When the holder base portion 13 is being mounted on the optical module 2, it is preferable for the lens 53 to first be mounted on the optical module 2 and for the holder base portion 13 to subsequently be mounted on the optical module 2.

(Integral Molding)

In order to integrally mold the holding portion 11 and the holder base portion 13 together as a single unit when the holding portion 11 is placed on top of the holder base portion 13, it is possible to use an injection molding method or to use another molding method, for example, compression molding. The material used for the holding portion 11 and the holder base portion 13 may be a thermoplastic resin or maybe a thermosetting resin. Specifically, it is possible to use, for example, an epoxy resin, a polyphenylene sulfide (PPS) resin, a liquid crystal polymer resin, and an ABS resin.

The present invention is not limited to the above described embodiment and various modifications may be made thereto.

In the example shown in the drawings, a structure is shown in which two engaging portions 36 engage with the front surface of the holding portion 11, however, the present invention is not limited to this and it is also possible to employ a structure in which the engaging portions engage with side portions of the holding portion. In addition, the number of engaging portions is not limited to two and may be one or three or more.

Furthermore, in the example shown in the drawings, a structure is shown in which the positioning pins 52 which are provided on the holder base portion 13 which is placed on top of the optical module 2 engage in the pinholes 4*h* of the optical connector 4, however, conversely, it is also possible to employ a structure in which positioning pins are formed on the optical connector and these positioning pins engage with pinholes on the substrate side.

The positioning pins and pinholes have the function of positioning the optical connector relative to the connector holder. In the present invention, the structure for positioning the optical connector relative to the connect the holder is not limited to this structure and it is also possible to employ a structure in which plate-shaped or column-shaped convex portions which are used for positioning are formed in one of the optical connector and the holder base portion, and concave portions that match the convex portions are formed in the other of the optical connector and the holder base portion, and these are then engaged with each other.

Figure 12:
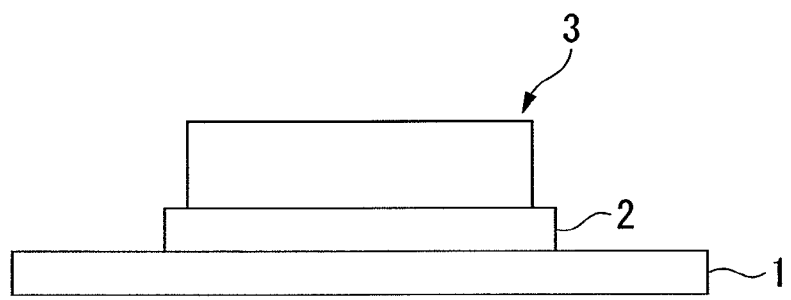
FIG. 12 is a typical view showing an example of the connector holder according to the present invention.
Figure 13:
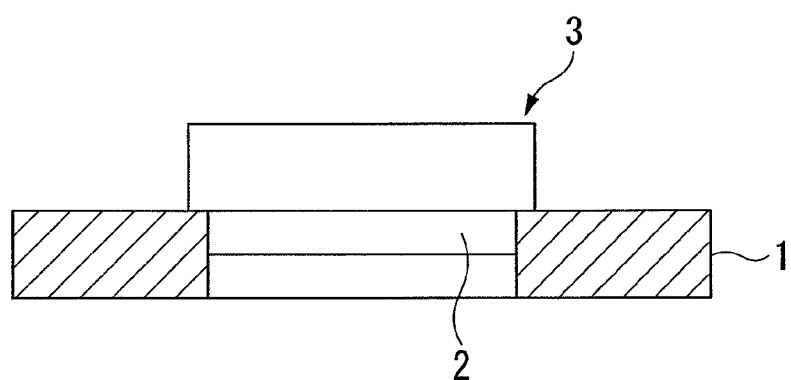
FIG. 13 is a typical view showing another example of the connector holder according to the present invention.

In the present invention, as is shown in FIG. 12, it is also possible to provide the connector holder 3 on top of the optical module 2 which is provided on the circuit board 1, or as is shown in FIG. 13, it is also possible to provide a connector holder 3 which is larger than the optical module 2 on top of the optical module 2, and to directly mount the connector holder 3 on the circuit board 1 at the portion where the connector holder 3 faces the circuit board 1.

In the example shown in the drawings, the connector holder 3 is provided with the holder base portion 13, however, in the present invention it is also possible for the connector holder to not be provided with a holder base portion.

It is preferable for the lens to be mounted directly on the optical module.

In addition to this, it is also possible to provide a mounting component in which positioning pins are provided on a plate-shaped base component on an optical module, and to mount an optical connector on this mounting component. It is preferable for an aperture portion to be formed in the mounting component, and for a lens to be provided in this aperture portion.

Figure 14:
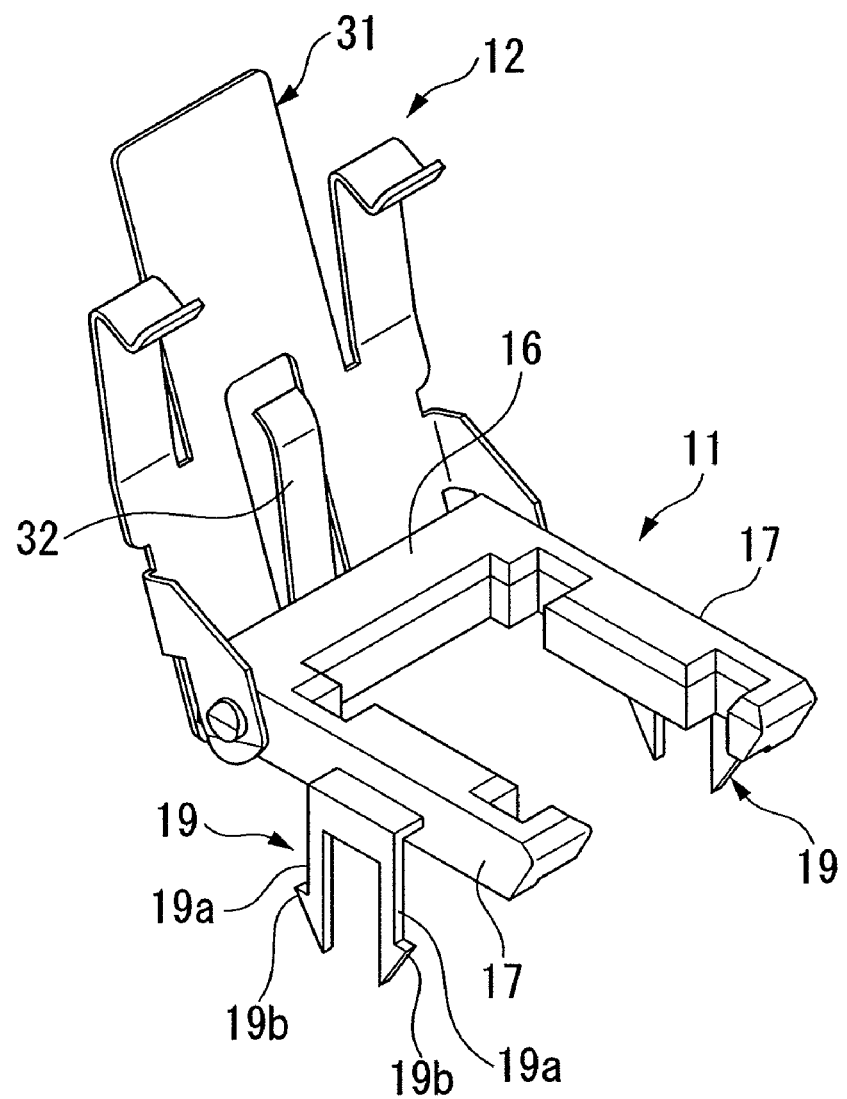
FIG. 14 is a perspective view showing another example of the connector holder according to the present invention.
Figure 15:
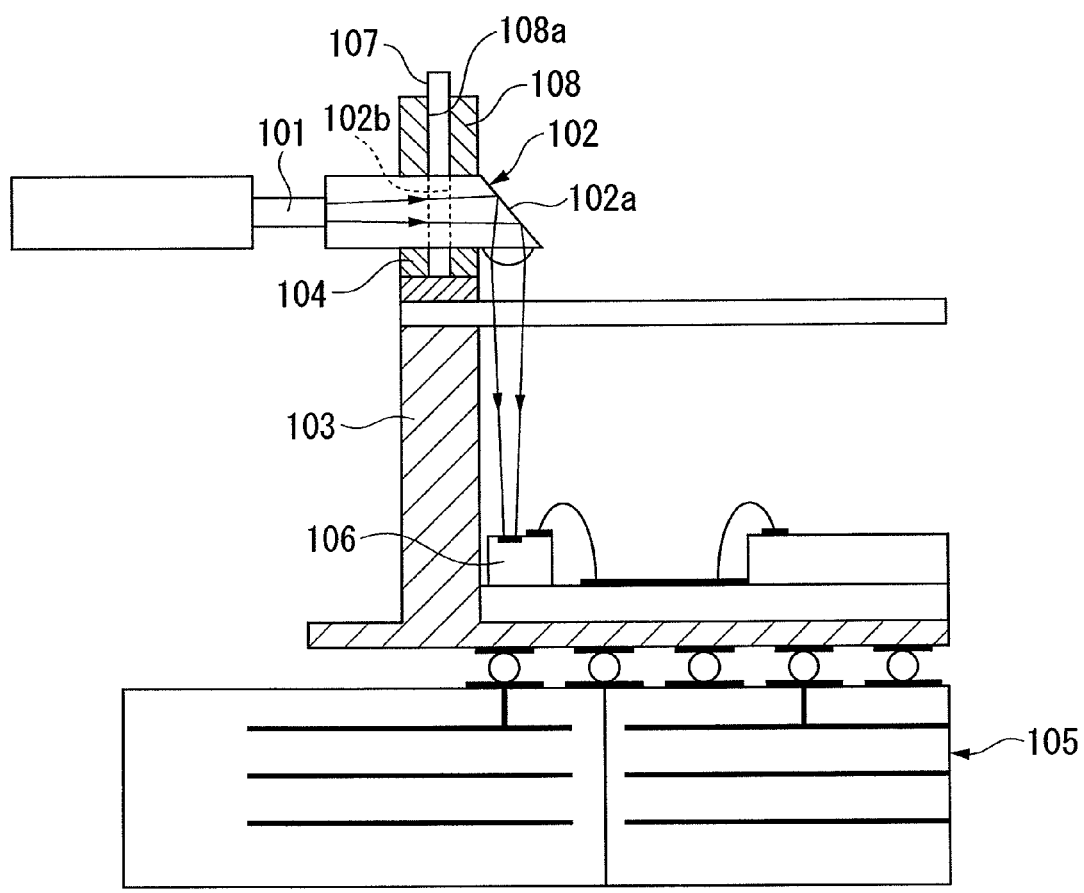
FIG. 15 is a typical view showing an example of a conventional connector holder.

FIG. 14 shows another embodiment of the connector holder of the present invention in which claw portions 19 are provided on outer side surfaces of the arm portions 17 of the holding portion 11. Each claw portion 19 has two extending portions 19*a* and 19*a* that extend downwards, and hooks 19*b* and 19*b* that are formed on a distal end of the two extending portions 19*a* and 19*a*.

The two extending portions 19*a* and 19*a* are formed apart from each other in the front-rear direction, and a hook 19*b* is formed on the front edge of the front extending portion 19*a* facing forwards, while a hook 19*b* is formed on the rear edge of the rear extending portion 19*a* facing rearwards.

In this connector holder, the claw portions 19 are inserted into engaging holes (not shown) that are provided in the optical module 2 (or circuit board 1), and the holding portion 11 is positioned relative to the optical module 2 as a result of the hook portions 19b being engaged with circumferential edge portions of the engaging holes.

According to this structure, it is possible to accurately position the holding portion 11 relative to the optical module 2, and also prevent the holding portion 11 becoming separated from the optical module 2.

INDUSTRIAL APPLICABILITY

In the connector holder of the present invention, because a lid portion is provided that has a pressing portion that presses an optical connector towards a substrate, the optical connector is held in place by the pressing portion. Because of this, the optical connector is placed in a position close to the substrate, and it becomes difficult for the position of the optical connector to shift relative to the substrate.

Accordingly, it is possible to accurately position an optical connector and secure satisfactory optical characteristics (i.e., optical loss and the like), and to optically connect an optical fiber to an optical input-output terminal.

The invention claimed is:

1. A connector holder that fixes onto a substrate on which an optical terminal has been provided an optical connector that is assembled onto a distal end of an optical fiber whose optical axis direction is different from an optical axis direction of the optical terminal such that the optical fiber and the optical terminal are optically connected, wherein:
   there are provided a holding portion that houses the optical connector, and a lid portion that is mounted on the holding portions;
   a holder base portion is provided between the substrate and the holding portion, and the optical connector is fixed to the holder base portion;
   positioning pins or pinholes are formed on the holder base portion, and the optical connector is fixed as a result of the positioning pins being engaged in pin holes or pinholes being engaged in the positioning pins in the optical connector; and
   a light path is formed in the holder base portion, the light path allows light traveling from the optical fiber towards the optical terminal to pass therethrough, and the light path allows light traveling from the optical terminal towards the optical fiber to pass therethrough.

2. The connector holder according to claim 1, wherein
   the lid portion is provided with a lid portion body and a pressing portion;
   the pressing portion is configured to press the optical connector towards the substrate; and
   the lid portion body is provided with an engaging portion that engages with the holding portion when the pressing portion is pressing optical connector.

3. The connector holder according to claim 1, wherein
   the lid portion is provided with a lid portion body and a pressing portion;
   the pressing portion is configured to press the optical connector towards the substrate; and
   the pressing portion is formed in the shape of a tongue piece that is able to undergo elastic deformation, and the optical connector is pressed by elasticity towards the substrate.

4. An optical-electrical converter having an attached connector holder that is provided with the connector holder according to claim 1, the connector holder fixes onto an optical-electrical converter on which an optical terminal has been provided an optical connector that is assembled onto a distal end of an optical fiber whose optical axis direction is different from an optical axis direction of the optical terminal such that the optical fiber and the optical terminal are optically connected, and with an optical- electrical converter.

5. An optical connector fixing structure that fixes onto a substrate on which an optical terminal has been provided an optical connector that is assembled onto a distal end of an optical fiber whose optical axis direction is different from an optical axis direction of the optical terminal such that the optical fiber and the optical terminal are optically connected via the connector holder according to claim 1.

6. A method of assembling a connector holder according to claim 1, wherein the holding portion and the holder base portion are molded separately and are then joined together.

7. The method of assembling a connector holder according to claim 6, wherein after the holder base portion has been positioned relative to the substrate, the holding portion is joined to this holder base portion.

8. The method of assembling a connector holder according to claim 6, wherein after the holding portion has been joined to the holder base portion, the holder base portion is positioned relatively to the substrate.

9. The method of assembling a connector holder according to claim 1, wherein the holding portion and the holder base portion are molded integrally as a single unit.

10. A holder base portion which is provided between a substrate on which an optical terminal has been provided and a holding portion that houses the optical connector, the optical connector assembled onto a distal end of an optical fiber whose optical axis direction is different from an optical axis direction of the optical terminal such that the optical fiber and the optical terminal are optically connected, wherein
    positioning pins or pin holes are formed on a holder base portion, and the optical connector is fixed as a result of the positioning pins being engaged in pin holes or pin holes being engaged in the positioning pins in the optical connector; and
    a light path is formed in the holder base portion, the light path allows light traveling from the optical fiber towards the optical terminal to pass therethrough, and the light path allows light traveling from the optical terminal towards the optical fiber to pass therethrough.

11. A lid portion that is mounted such that it can open and close freely on a holding portion which is part of the connector holder according to claim 1, wherein a lid portion body presses the optical connector towards the substrate.

12. The lid portion according to claim 11, wherein the lid portion body is provided with engaging portions that engages with the holding portion when the pressing portion is in a state of pressing the optical connector.

13. The connector holder according to claim 1, wherein
    the holding portion is a frame portion surrounding the optical connector fixed to the holder base portion; and
    the lid portion comprises a top plate portion and an engaging portion that extends out from the top plate portion having claw portion, the engaging claw portion can engage with the rear edge of the frame portion.

14. The connector holder according to claim 1, wherein the lid portion is mounted on the holding portions such that it can open and close freely.

* * * * *